United States Patent [19]

Abe et al.

[11] Patent Number: 4,778,709
[45] Date of Patent: Oct. 18, 1988

[54] HOLLOW PLATE MADE OF SYNTHETIC RESIN

[75] Inventors: Nobuo Abe, Ayase; Seizo Noda, Kiyose, both of Japan

[73] Assignee: Ikeda Bussan Co., Ltd., Ayase, Japan

[21] Appl. No.: 100,183

[22] Filed: Sep. 23, 1987

[30] Foreign Application Priority Data

Sep. 24, 1986 [JP] Japan .......................... 61-145039[U]

[51] Int. Cl.⁴ ............................................. B05D 3/12
[52] U.S. Cl. .................................. 428/166; 296/37.16; 296/901; 428/167; 428/178; 52/792; 52/508
[58] Field of Search ............... 428/166, 167, 172, 188, 428/178; 264/534, 296; 52/792, 801, 287, 387, 508, 589, 592; 296/31 P, 37.16

[56] References Cited

U.S. PATENT DOCUMENTS

| | | | |
|---|---|---|---|
| 3,222,237 | 12/1965 | McKelvy | 428/167 |
| 3,935,357 | 1/1975 | Padovani | 428/166 |
| 3,935,358 | 1/1976 | Wyeth et al. | 428/166 |
| 4,167,598 | 9/1979 | Logan et al. | 428/166 |
| 4,670,324 | 6/1987 | Sato et al. | 428/178 |

*Primary Examiner*—Robert R. Song
*Attorney, Agent, or Firm*—Foley & Lardner, Schwartz, Jeffery, Schwaab, Mack, Blumenthal & Evans

[57] ABSTRACT

A hollow plate made of synthethic resin including hollow portions, and contacted portions intermittently formed by bending the lower face of each of the hollow portions inward and then contacting it with the underside of an upper face, wherein the lower face at each of the contacted portions is tapered to become thicker and thicker toward its center.

3 Claims, 2 Drawing Sheets

HOLLOW PLATE MADE OF SYNTHETIC RESIN

BACKGROUND OF THE INVENTION

1. Field of the Invention

The present invention relates to a hollow plate made of synthetic resin and used as the luggage panel, tonneau-board or the like which is arranged at the back of the rear seat in cars, for example.

2. Prior Art

Conventionally, the luggage panel for cars, for example, is made by blow-molding synthetic resin to a hollow plate which is light in weight and easy to manufacture.

FIG. 1 shows one of these conventional hollow plates wherein semi-melted hollow body (which will be hereinafter referred to as parison) of synthetic resin is placed in a die, deformed along the die by pressurized air blown in, and then cooled and hardened. The hollow plate thus formed has hollow portions (b) and its lower face (c) is corrugated to intermittently form together with its upper face (d) those portions (e) where the lower and upper faces are contacted each other. It is arranged that T equals to 2t by 0.8 wherein T represents the thickness of each of these contacted portions (e) and (t) denotes the thickness of each of the lower and upper faces (c) and (d). The lower and upper faces (c) and (d) are thus reliably contacted each other at these portions (e).

The hollow plate of this kind is provided with the contacted portions (e) to reinforce its rigidity, and it is often seen that some reinforcing members (f) such as pipes are inserted into its hollow portions to further enhance its rigidity. When the reinforcing members (f) are inserted at its molding process in this case, it is warped because of shrinkage difference between its resin and the reinforcing member (f). Therefore, each of the reinforcing members (f) has a diameter fitting to its respective hollow portion and they are inserted into the hollow portions after the molding process.

In the case of the hollow plate thus formed, however, its contacted portions (e) are compressed to have a thickness of T=2t×0.8. Therefore, this compression causes parison flashes to be swelled out, each having a mass of about 2t−T. The parison flashes are swelled out into the hollow portions to form protruded portions (g) in the hollow portions, as shown in FIG. 1. It is therefore often seen that the reinforcing members (f) each of which is selected to have a diameter fitting to its respective hollow portion cannot be inserted into the hollow portions (b) because of the protruded portions (g). Further, the protruded portions (g) thus formed are different in size. The reinforcing members (f) must be selected therefore to have diameters which are different every hollow portion. If not, they may not fit to the hollow portions, or they may crack or swell those resin portions where they are forcedly inserted.

SUMMARY OF THE INVENTION

The present invention is therefore intended to eliminate the above-mentioned drawbacks and an object of the present invention is to provide a hollow plate having no protruded portion in its hollow portions.

Another object of the present invention is to provide a hollow plate enabling those reinforcing members, which are inserted into the hollow portions, to be same in size.

According to the present invention, there can be provided a hollow plate having hollow portions wherein a lower face is bent inward to form the hollow portions and it is tapered to become thicker and thicker toward its center at those portions where it is contacted with an upper face.

The parison flashes which are to be caused at the blow molding process are carried away along the tapered portions where the lower and upper faces are contacted each other, thereby preventing the protrusions from being swelled out into the hollow portions. Therefore, reinforcing members can be reliably and tightly inserted into the hollow portions.

Further, the contacted portions include tapered portions, thick enough, thereby enhancing the rigidity of the whole hollow plate.

DETAILED DESCRIPTION OF THE PREFERRED EMBODIMENT

The present invention will be described in detail, citing a hollow plate used as the luggage panel for cars and referring to the accompanying drawings.

Figure 1:
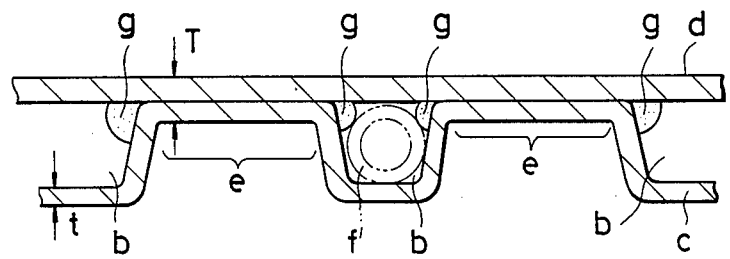
FIG. 1 is an enlarged sectional view showing one of the conventional hollow plates.
Figure 2:
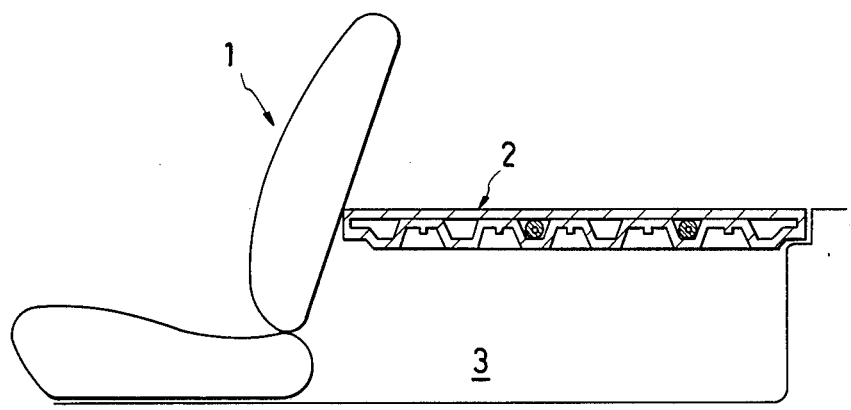
FIG. 2 is a sectional view showing an example of the hollow plate made of synthetic resin according to the present invention and used as the luggage panel in a car.

FIG. 2 is a sectional view showing a luggage panel arranged in a car. The luggage panel 2 which is a hollow plate is arranged at the back of the rear seat to openably partition the car room from the trunk room, thereby enabling various matters to be placed on the luggage panel 2, too.

Figure 3:
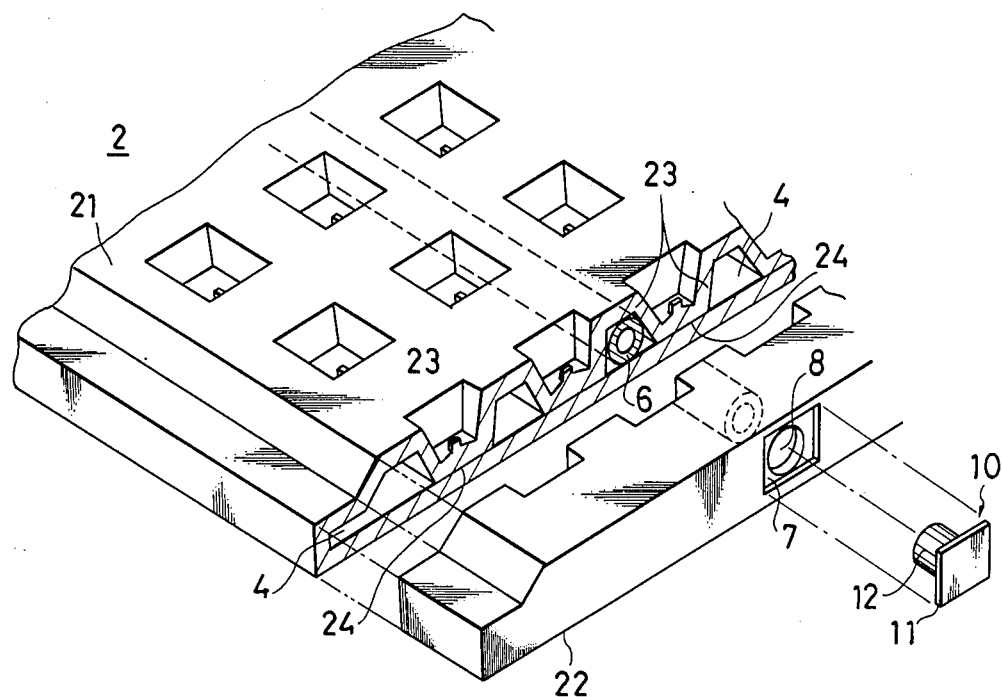
FIG. 3 is a perspective view showing a reinforcing member inserted into the hollow plate made of synthetic resin.

As shown in FIG. 3, the luggage panel 2 is made by blow-molding a synthetic resin such as polyethylene to a plate, which is provided with hollow portions 4 and whose lower face 21 is bent on the underside of an upper face 22 to form bent portions 23 and contacted portions 24.

A reinforcing member 6 such as the metal pipe is inserted into the hollow portion 4, which is defined by the contacted portions 24, over the whole length of the car width, thereby giving large rigidity to the resin-made hollow plate. As shown in FIG. 3, the reinforcing member 6 is inserted into the hollow portion 4 through an opening 8 which is formed at a cut-away portion 7 in one side of the luggage panel 2, and it is fixed when a resin-made cap 10 is fitted in the cut-away portion 7. The cap 10 includes a cap portion 11 and a fitting portion 12, and the fitting portion 12 is elastically fitted into the opening 8. When the fitting portion 12 is fitted like this, the cap portion 11 comes into the cut-away portion 7 and it is held there to keep its outer face same in level as the side of the luggage panel 2.

Figure 4:
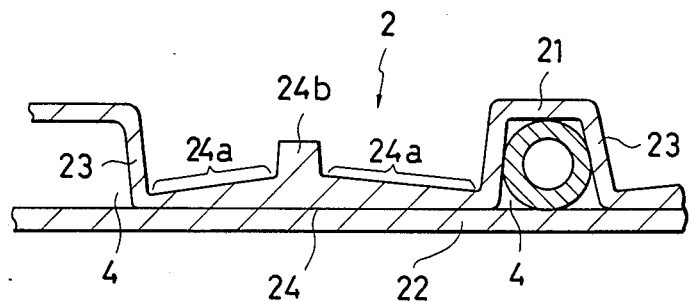
FIG. 4 is a sectional view showing that portion of the resin-made hollow plate where upper and lower faces are contacted each other.

Each of the contacted portions 24 is shaped like a square, as shown in FIG. 3, and the lower face of each of the contacted portions 24 is tapered to become thicker and thicker from the base of the bent portion 23 toward its center, as shown in FIG. 4. The tapered portion 24a thus formed includes a rib 24b on its top.

The tapered portion 24a and the rib 24b are molded by the blow-molding die and the so-called parison flashes which are to be caused when the thickness of the upper and lower faces 22 and 21 are compressed to 2t×0.8 at the contacted portion 24 are used to form the tapered portion 24a and the rib 24b. More specifically, the parison flashes which are to be swelled out at the blow molding process are carried away to fit to tapered and rib portions of the die, thereby preventing the parison flashes from being swelled out into the hollow portion 4.

The present invention is not limited to the above-described luggage panel 2 but it can be applied to any of the hollow plates which need to be reinforced.

Although the present invention has been described citing its preferred embodiment, it should be understood that various changes and modifications can be made without departing from the spirit and scope of the present invention.

We claim:

1. A hollow plate made of synthetic resin comprising an upper face, and a lower face erected like a convex to intermittently form a plurality of bent portions and contacted with the underside of the upper face to form contacted portions, wherein the lower face at each of the contacted portions is tapered to become thicker and thicker from its rim to its center.

2. A hollow plate made of synthetic resin according to claim 1 wherein a reinforcing member is inserted into a hollow portion, which is defined by the contacted portions, over the whole length of the car width.

3. A hollow plate made of synthetic resin according to claim 1 wherein a rib is formed on the top of the tapered portion of the lower face at each of the contacted portion.

* * * * *